United States Patent
Wurm

(10) Patent No.: US 8,020,636 B2
(45) Date of Patent: Sep. 20, 2011

(54) METHOD AND APPARATUS FOR INTRODUCING A GEOTHERMAL PROBE INTO THE EARTH

(75) Inventor: Dieter Wurm, Kirchhundem (DE)

(73) Assignee: TRACTO-TECHNIK GmbH & Co. KG, Lennestadt (DE)

( * ) Notice: Subject to any disclaimer, the term of this patent is extended or adjusted under 35 U.S.C. 154(b) by 329 days.

(21) Appl. No.: 11/941,332

(22) Filed: Nov. 16, 2007

(65) Prior Publication Data
US 2008/0283297 A1    Nov. 20, 2008

(30) Foreign Application Priority Data
Nov. 16, 2006  (DE) .......................... 10 2006 054 435

(51) Int. Cl.
*E21B 49/10* (2006.01)

(52) U.S. Cl. .......................................... 175/58; 166/100

(58) Field of Classification Search ................... 175/50, 175/58; 166/100, 250.01
See application file for complete search history.

(56) References Cited

U.S. PATENT DOCUMENTS

| | | | |
|---|---|---|---|
| 1,387,733 A | 8/1921 | Midgett | |
| 2,460,673 A * | 2/1949 | Berscheid | 175/419 |
| 3,789,936 A * | 2/1974 | McCullough | 340/855.2 |
| 5,623,986 A | 4/1997 | Wiggs | |
| 5,634,515 A | 6/1997 | Lambert | |
| 6,158,531 A | 12/2000 | Vail | |
| 6,369,574 B1 * | 4/2002 | Ederlov et al. | 324/339 |
| 6,672,371 B1 | 1/2004 | Amerman et al. | |

FOREIGN PATENT DOCUMENTS

| | | |
|---|---|---|
| DE | 69 07 926.1 | 7/1969 |
| DE | 10317664 B3 * | 10/2004 |
| DE | 10 2004 054 153 | 5/2006 |
| EP | 0 017 783 | 5/1983 |
| GB | 2 410 043 A | 7/2005 |
| JP | 58213188 | 3/1982 |
| JP | 2001-342787 | 12/2001 |
| WO | WO 99/22114 | 5/1999 |
| WO | WO 01/33045 | 5/2001 |
| WO | WO 03/106806 | 12/2003 |

* cited by examiner

*Primary Examiner* — William P Neuder
*Assistant Examiner* — Catherine Loikith
(74) *Attorney, Agent, or Firm* — Henry M. Feiereisen; Ursula B. Day

(57) ABSTRACT

In a method for introducing a geothermal probe into the earth, a geothermal probe is introduced in a radiating manner with the drill head into the earth. After the drilling operation, the drill head remains in the earth. The drill head is introduced into the earth with the assistance of a rod linkage.

4 Claims, 7 Drawing Sheets

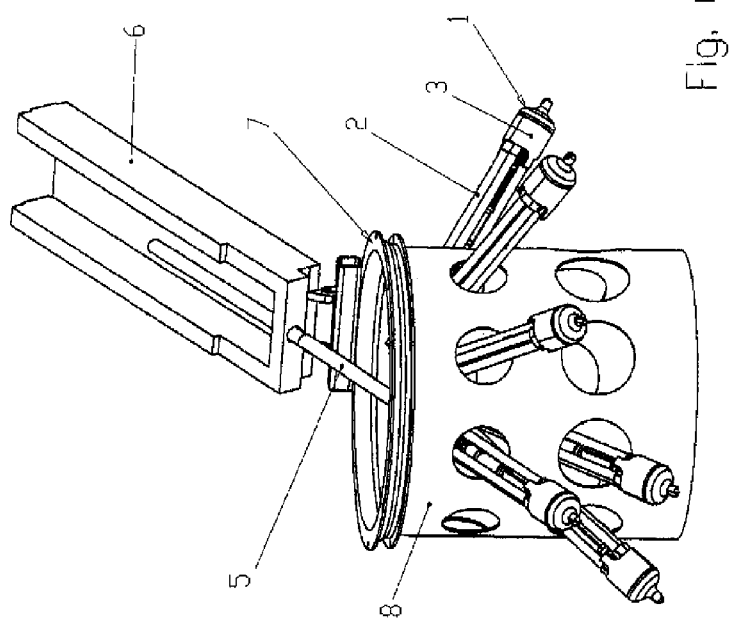

US 8,020,636 B2

METHOD AND APPARATUS FOR INTRODUCING A GEOTHERMAL PROBE INTO THE EARTH

CROSS-REFERENCES TO RELATED APPLICATIONS

This application claims the priority of German Patent Application, Serial No. 10 2006 054 435.8, filed Nov. 16, 2006, pursuant to 35 U.S.C. 119(a)-(d), the content of which is incorporated herein by reference in its entirety as if fully set forth herein.

BACKGROUND OF THE INVENTION

The present invention relates to a method and apparatus for introducing a geothermal probe into the earth.

Nothing in the following discussion of the state of the art is to be construed as an admission of prior art.

The geothermic field, in particular the field of exploitation of geothermal energy for heating houses, requires introduction of geothermal probes into the earth. This may be realized by excavating the earth or through bores in the earth in order to be able to place the probes, used for heat exchange, into the earth or into the bore. In addition to a deep borehole, bores are also considered which cover a greater area of the earth for use as heat exchanger. To realize the respective exchange surface without the need for providing excessively deep bores, it is known to establish several bores to then combine several probes to a system. A drilling device, for example a worm-type auger, establishes hereby first a pilot bore. In a second step, the drilling device or the drill rod linkage and the drill head are extracted from the earth, and in a third step, the probes, i.e. the lines and technique for the heat exchange with the earth, are placed into the established bore. Vertical drilling machines are typically used hereby, whereby down-the-hole-hammer drilling methods, double-head drilling methods, or rotary drilling methods are utilized.

U.S. Pat. No. 5,634,515 describes a method and a respective apparatus for introducing probes into a bore. This apparatus should enable a simplified introduction of geothermal systems into the earth, useful in particular in already developed locations. This printed publication intends hereby to avoid the open laying of pipes which is cost-intensive and detrimental to the nature, as oftentimes used when installing probes horizontally. This problem is normally addressed conventionally by establishing a vertical bore. This requires, however, heavy machinery for providing the bore and causes vibrations and shaking that may damage surrounding facilities and buildings. To address this problem, it is proposed to lay the probes without excavation, however not in vertical alignment. This involves drilling of several channels into the earth in a certain manner. In a second step, the respective probes are placed into these bores.

Common to all methods described in the prior art is the drawback of requiring first the establishment of a borehole and then a removal of the drilling tool in order to be able to insert the geothermal probe into the borehole.

This is especially cumbersome when, in order to avoid deep drilling, the provision of a multiplicity of bores is required to realize a sufficient heat exchange with the earth.

It would therefore be desirable and advantageous to address prior art problems and to obviate other prior art shortcomings.

SUMMARY OF THE INVENTION

According to one aspect of the present invention, a method of introducing a geothermal probe into the earth includes the steps of inserting a geothermal probe together with a drill head into the earth, and leaving the drill head in the earth after a drilling operation.

The present invention resolves prior art problems by introducing the individual geothermal probes into the earth without requiring a subsequent extraction of the drilling tool and/or drill rod linkage from the earth.

A drill head may hereby be used which remains in the earth after being drilled in. According to a particularly preferred embodiment, the drill head can be introduced into the earth jointly with the probe and a rod linkage, whereby the rod linkage can be detached from the drill head after drilling for subsequent extraction from the earth. The probe remains in the earth together with the drill head and is ready for use, without losing the rod linkage at the same time.

The application of the method according to the invention and the apparatus according to the invention is not limited to laying geothermal probes but is also suitable for use in such areas that pose similar problems and in particular benefit from time savings by using the method according to the invention. Thus, the term "geothermal probe" is used in accordance with the invention as representative for all devices that are to be introduced into bores and are inserted conventionally in two or more steps, i.e. devices that require initial establishment of a pilot bore, subsequent removal of the drilling device, and then introduction of the device that is actually to be inserted.

The application of the method according to the invention and the apparatus according to the invention is especially advantageous with small drilling equipments, which is the case especially when geothermal probes are later laid in developed locations and which permit the establishment of a multiplicity of bores in a short time so that the required depth of the individual bore can be reduced in the absence of any loss of heat exchange surface.

According to another feature of the present invention, the bore may be realized by an inclination drilling method which involves the establishment of bores which radiate from a point in different directions. This allows a quick use of small drilling gear without constant translocation while at the same time avoids overly stressing the nature. Moreover, the provision of bores in developed locations is also possible when narrow spaces are involved. The bore is suitably aligned such that water-carrying layers are captured to attain higher heat removal efficiency. The radiating configuration of the bore already increases per se in all likelihood the capture of such a layer.

According to another feature of the present invention, the probe may be constructed in the form of a U-shaped loop to thereby allow circulation of a heat medium.

According to another feature of the present invention, the drill head may be connected to the rod linkage by a bayonet joint or plug connection and is also detachable via the bayonet joint. This may be attained by a certain turning motion for example. The drill head may be firmly connected with the rod linkage in a rotary device. In this rotary device, the drill head is then drilled with the probe into the earth with the assistance of the rod linkage. Reversing the rotation direction of the rotary device—this should be executed only at the conclusion of the drilling process—causes the rod linkage to detach from the drill head so that the rod linkage can then be withdrawn from the drilled channel.

According to another feature of the present invention, the hollow space between the probe and the bore wall may be tamped as the rod linkage is extracted.

The geothermal probes are suitably introduced from a shaft into the earth via a drill slide. The drill slide is hereby configured such that the bore route can be individually aligned to establish a radiating arrangement of the bores.

The drill head according to the invention may include a free-wheel to permit a rotation of the rod linkage without co-rotation of the probe. The free-wheel can be preferably split to simplify installation.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 6 is a representation of the method according to the invention with a drill slide.

DETAILED DESCRIPTION OF PREFERRED EMBODIMENTS

Figure 1:
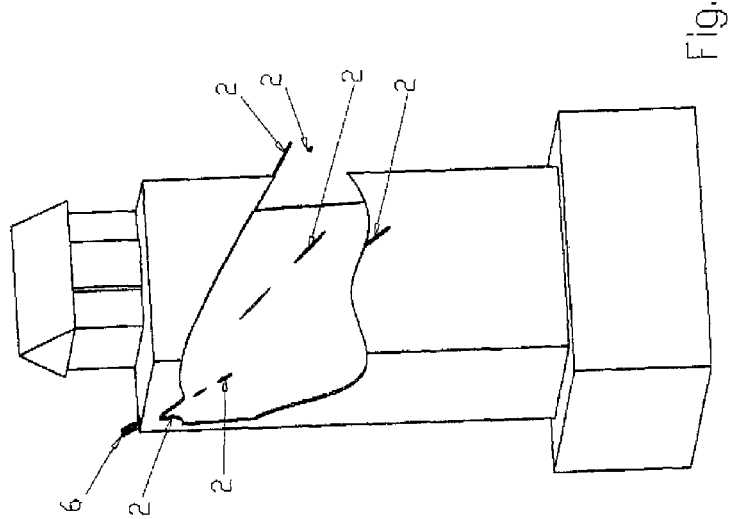
FIG. 1 is a schematic illustration of the single mode method with radiating bore channels in accordance with the invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

As shown in FIG. 1, the provision of several bores for insertion of geothermal probes 2 involves the introduction of a drill head 1 with a free-wheel 3 rod linkage into the earth. After the operating step of drilling, the rod linkage 5 is separated from the drill head by means of a release mechanism of the drill head 1, when the desired drilling depth has been reached, and extracted from the earth. When the rod linkage is removed, the space between the geothermal probe 2 and the bore wall is tamped. The geothermal probe 2 remains in the borehole just like the drill head and is then ready for use.

The drill head 1 has a free-wheel 3 with a shank for the rod linkage 5, with the shank having a square configuration on the side proximal to the rod linkage to thereby permit a form-fitting connection with a corresponding bushing on the rod linkage 5. On the head-proximal side, the shank 30 has a recessed region for the free-wheel 3. The free-wheel 3 allows a rotating bore without torque transfer onto the geothermal probe 2. The geothermal probe 2 is introduced into the earth by placing it onto the free-wheel 3, with the drill head 1, which is connected to the free-wheel 3, freely rotating as the rotation of the rod linkage 5 is transmitted via the square connection onto the drill head 1. An engaging shoulder 21 is provided to transmit an axial force in the direction of the drilling axis via which the geothermal probe 2 follows the drill head 1 into the bore.

Figure 4:
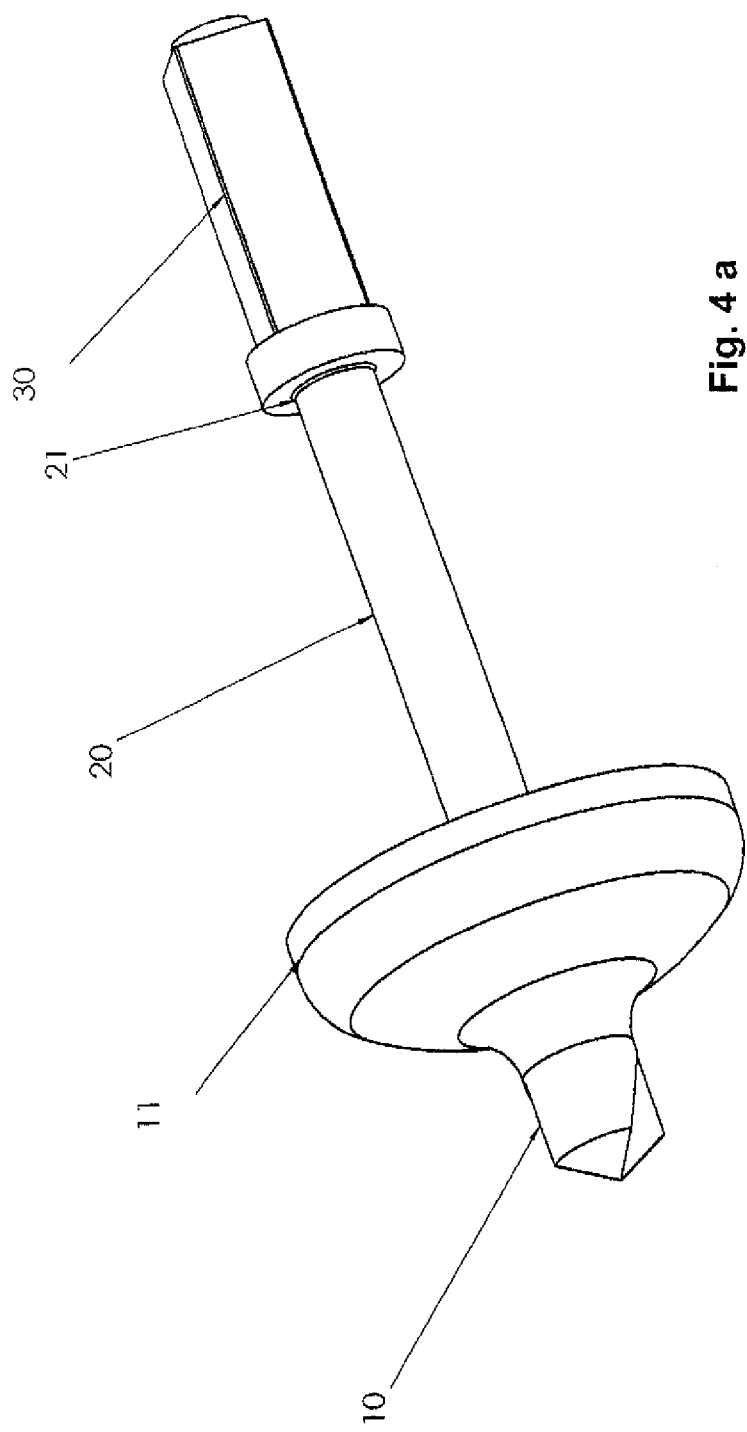
FIGS. 4a, 4b are partial illustrations of the apparatus according to the invention of FIG. 2 with square shank and bayonet joint.
Figure 4B:
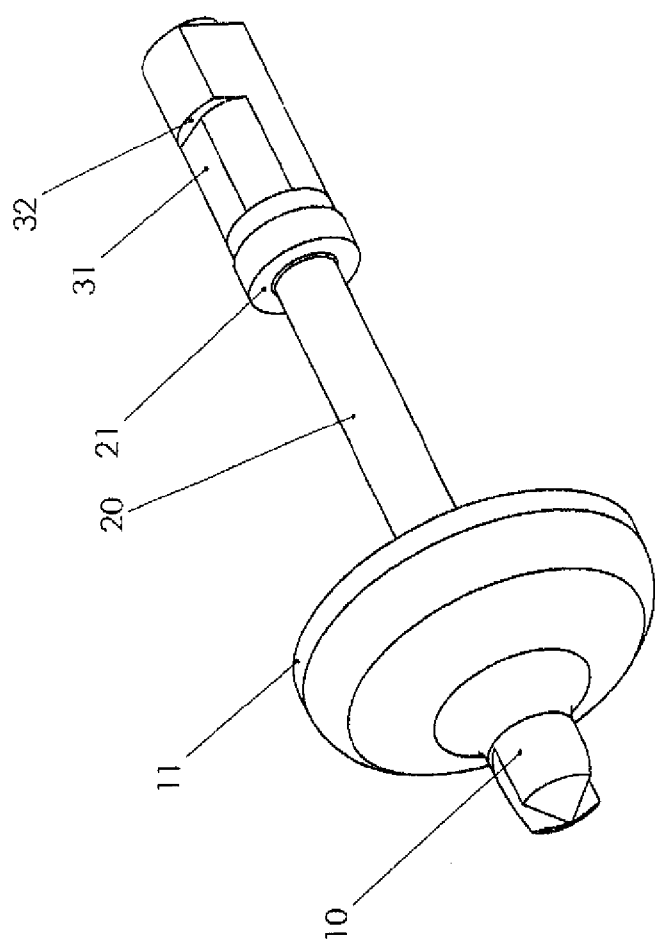

The geothermal probe 2 is placed together with the drill head 1 in the drill slide axis for insertion into the earth and, after alignment during establishment of a bore, directly introduced in the selected axis into the earth. A bayonet joint with a shoulder 32 and a locking nut 31, as shown in FIG. 4b, permits the drill head 1 to be extracted after conclusion of the drilling operation by loosening the bayonet joint or, as an alternative, the drill head 1 to be withdrawn, if this becomes necessary.

Figure 2:
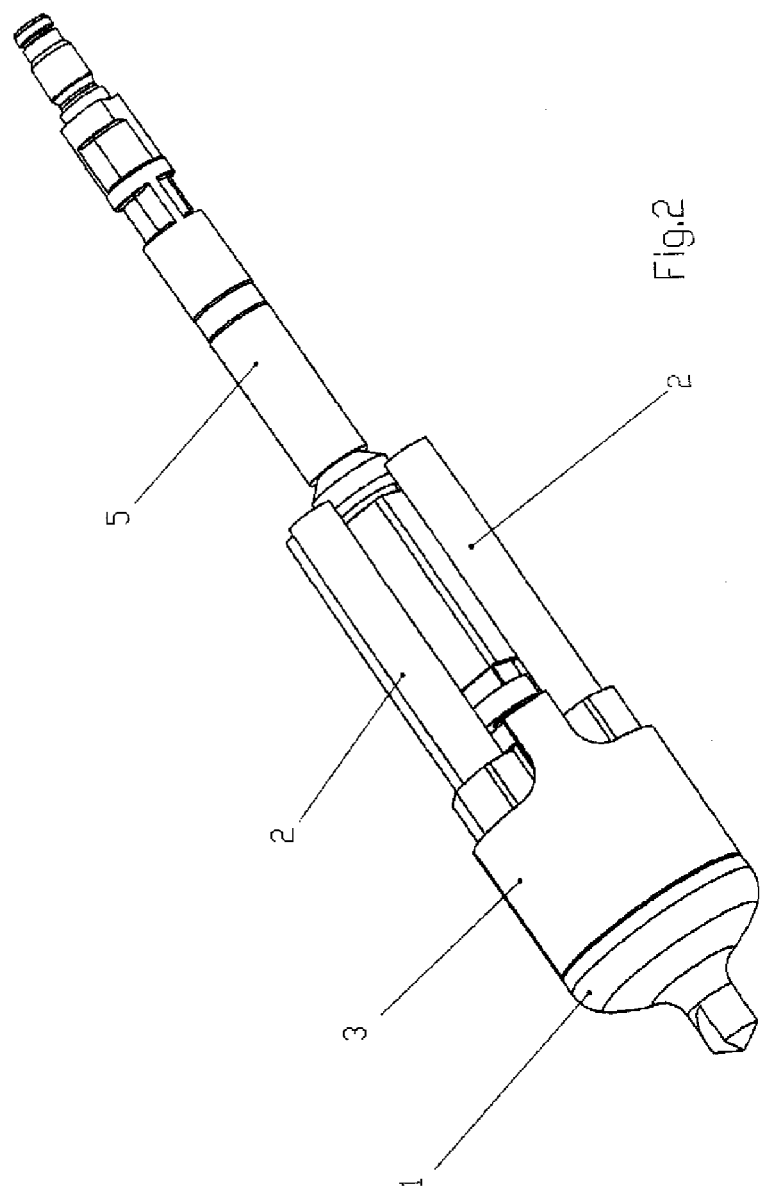
FIG. 2 is a schematic illustration of an apparatus according to the invention for executing the method.
Figure 3:
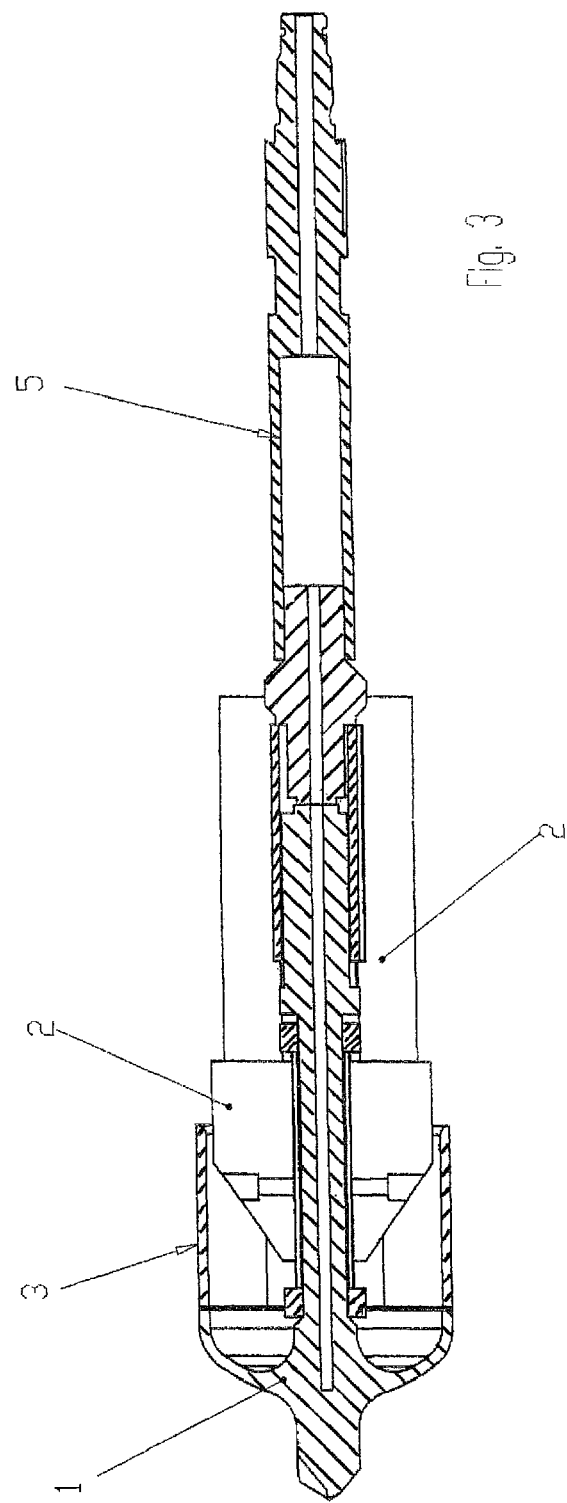
FIG. 3 is a sectional view of the apparatus of FIG. 2.

As shown in FIG. 2, the drill head 1 has several functional zones. The drill head tip 10 is provided to center and guide the rod linkage during introduction into the earth. The end face of the zone 11 of the drill head is shaped to prevent a deflection of the drill head 1 during drilling operation and allows at the same time to drill the required outer diameter. The connection is so configured as to allow withdrawal of the drill head so long as the connection is not unlocked.

Figure 5:
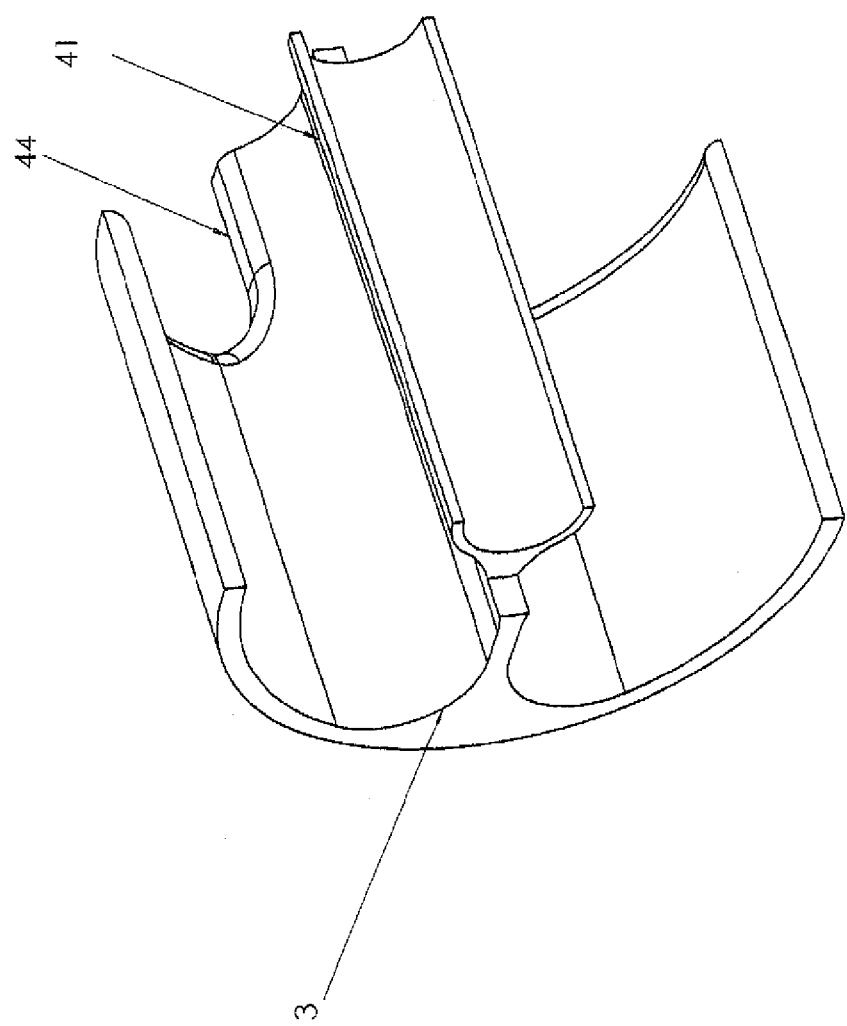
FIG. 5 is a isometric illustration of a half-shell according to the invention as embodiment of the free-wheel of the apparatus of FIG. 2.

FIG. 5 shows the free-wheel 3 in the form of a half-shell. A centering sleeve 41 extends on the recessed shank region 20 on the side of the drill head. The half-shells are hereby used to enable easy placement of the geothermal probe 2 and to then embrace it. The installation of the geothermal probe is simplified by the provision of the recess 44.

When using a drill slide, as shown in FIGS. 1 and 6, the drill slide 6 is placed onto an existing shaft 8 and respectively aligned on a revolving rail 7 to realize a radiating arrangement of the bores and thus of the probes 2. This has the particular advantage that the existing ground can be utilized in an optimum manner while in all likelihood being able to capture water voids.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed is:

1. Apparatus for introducing a geothermal probe into the earth, comprising:
   a drill head with a free-wheel for acceptance of a geothermal probe,
   a rod linkage; and
   an adapter for detachable connection of the rod linkage to the drill head so as to permit a release of the rod linkage from the drill head in the earth after the drilling operation in the earth, wherein the adapter has a square shank for connection to the rod linkage; and
   an engagement shoulder for axial guidance of the geothermal probe.

2. The apparatus of claim 1, wherein one of the drill head and adapter has a bayonet joint.

3. The apparatus of claim 1, wherein the drill head has a centering tip.

4. The apparatus of claim 1, wherein the geothermal probe is constructed in the form of a U-shaped loop.

* * * * *